United States Patent [19]

Cerceau

[11] Patent Number: 4,824,442
[45] Date of Patent: Apr. 25, 1989

[54] METHOD OF MANUFACTURING COMPOSITE THERMOSTABLE ABRASIVE PRODUCTS

[75] Inventor: Jean-Michel Cerceau, Seyssinet, France

[73] Assignee: Societe Industrielle de Combustible Nucleaire, Annecy, France

[21] Appl. No.: 206,378

[22] Filed: Jun. 14, 1988

[30] Foreign Application Priority Data

Jun. 16, 1987 [FR] France ................... 8708368

[51] Int. Cl.$^4$ ............................................. B24D 3/00
[52] U.S. Cl. ....................................... 51/293; 51/295; 51/307; 51/309
[58] Field of Search ................... 51/293, 295, 307, 309

[56] References Cited

U.S. PATENT DOCUMENTS

| | | | |
|---|---|---|---|
| 3,663,191 | 5/1972 | Kroder | 51/293 |
| 3,868,235 | 2/1975 | Held | 51/309 |
| 4,496,372 | 1/1985 | Almond et al. | 51/293 |
| 4,505,721 | 3/1985 | Almond et al. | 51/309 |
| 4,525,178 | 6/1985 | Hall | 51/293 |
| 4,527,998 | 7/1985 | Knemeyer | 51/309 |
| 4,604,106 | 8/1986 | Hall et al. | 51/293 |

Primary Examiner—Paul Lieberman
Assistant Examiner—Willie J. Thompson
Attorney, Agent, or Firm—Fleit, Jacobson, Cohn & Price

[57] ABSTRACT

For preparing a composite abrasive product having an active part, formed by a compact containing grains of ultra-hard product representing more than 80% per volume of the compact, each grain being bonded directly to its neighbors so that the compact has a polycrystalline structure, and by a hard and refractory support bonded to the compact, formed essentially of a refractory carbide such tungsten carbide, characterized in that: a layer of ultra-hard product grains (PCD or CBN) is placed in contact with components generating an ultra-hard ceramic binder phase in the cell. The powder layer is covered with a thin layer of tungsten coated with a carbide supplying material and, finally, with a tungsten carbide support. The cell containing the stack thus formed is brought to a temperature and a pressure sufficient to cause plastic phase sintering of the ultra-hard product grains with each other and bonding of the compact to the support.

9 Claims, 1 Drawing Sheet

4,824,442

METHOD OF MANUFACTURING COMPOSITE THERMOSTABLE ABRASIVE PRODUCTS

BACKGROUND OF THE INVENTION

1. Technical Field

The invention relates to composite abrasive products of the type having an active part, consisting of a compact containing grains of ultra-hard product (diamond or cubic boron nitride) representing more than 80% percent per volume of the compact, each grain being bonded directly to its neighbours so that the compact has a polycrystalline structure, and a hard and refractory support integrally bonded with the compact, formed essentially by a refractory carbide such as tungsten carbide.

The term "compact" designates a sintered product formed by grains bonded together by bridges, created by diffusion of material in the plastic state. Such sintering in the plastic phase is obtained at pressures and temperatures of the same order of magnitude as the pressures and temperatures used to synthetize diamond grains, when the compact is diamond based, and those required for transforming hexagonal boron nitride into cubic boron nitride (CBN) if the ultra-hard product is CBN.

Numerous applications require thermostable abrasive products, i.e. products which can be heated to high temperatures during use thereof without rapid destruction. Much work has been carried out for about fifteen years for providing the compacts themselves, then composite abrasive products incorporating them, with such a thermostable character.

2. Prior Art

Composite products of the above-defined type have been known for a very long time. French patent No. 2,089,415 describes a composite product formed of a diamond compact on a tungsten carbide support, the compact and the carbide containing a same additive which acts as a catalyst for converting carbon into diamond and as a sintering binder, which may be nickel or cobalt.

Such a product is not suitable for cutting under conditions which raise it to a high temperature. The cobalt-containing polycristalline diamond compact is not thermostable. The interface between the compact and the support, formed of tungsten carbide, diamond and binder, does not resist under such conditions, even when a metal barrier has been inserted during manufacture between the support and the compact.

In an attempt to make the compact thermostable, it has been proposed to eliminate the catalyst by leaching (U.S. Pat. No. 3,745,623). But the residual compact is porous and has a very large specific area, so that its life duration at high temperature is reduced by oxidation, and its resistance to abrasion, even at ambient temperature, is reduced due to the absence of an intergranular bonding phase.

Attempts have been made to overcome this drawback either by infiltrating a ceramic phase into the pores of a leached compact or by creating a ceramic phase from the metal phase, comprising at least a catalyst, during manufacture. But this improvement, although it makes it possible to give the compact itself a thermostable character, does not solve another problem which, apparently, has not been completely appreciated up to the present invention.

Whether the compact is made of CBN rendered thermostable due to the nature of the binders which it contains, or whether it is made of polycrystalline diamond rendered thermostable by substituting a ceramic phase for a metal catalyst, it has been found that, when the product mounted on a support is subjected, during use, to high temperatures, there is failure of the interface due to the stresses. Now, for numerous applications, for example ground drilling, the abrasive product is subjected to such stresses that it is desirable for it to withstand them at high temperature.

SUMMARY OF THE INVENTION

It is an object of the invention to provide an abrasive product of the above-defined type capable of simultaneously withstanding shearing stresses and high temperatures of use, which may exceed 1100° C. in a neutral or reducing atmosphere.

For that purpose, the invention provides a method for producing an abrasive product of the above-defined type, wherein: a layer of ultra-hard product grains is placed in contact with compounds of such nature as to generate a bonding ceramic phase in a cell; the powder is covered with a thin tungsten layer and with carbon supplying material and, finally, with a sintered or not-sintered tungsten carbide support; and the cell containing the so formed stack is brought to a temperature and a pressure sufficient to cause mutual plastic phase sintering of the ultra-hard product grains and to cause bonding of the compact thus obtained with the support.

Tungsten is in the form of a sheet having a thickness of from 200 to 400 μm, advantageously about 250 μm; the term "carbon supplying material" designates a material formed exclusively or almost exclusively of carbon in any form or so other which it is able to yield up. The carbon layer will always have an extremely small thickness, appreciably lesser than that of the tungsten, about 30 to 300 nm. Such thicknesses may be obtained by vaporization and vacuum depositing, or by vapor phase deposition of carbon on the substrate.

Tests have been carried out and have shown that the products obtained by this method have a resistance to shearing at the interface, at high temperature, much greater than products existing at present. Although the accuracy of this explanation should not be considered as a condition of validity of this patent, it may be thought that the favorable effect of the carbon is due to the fact that the binder contained in the support is blocked by the combination of tungsten and carbon and carburation of tungsten is caused by carbon delivery to the coating, without appreciable modification of the chemical nature of the elements of the zone of the substrate close to the compact.

The method which has just been defined provides an abrasive product of the above-defined type, whose active part comprises, in addition to the ultra-hard product, a bonding phase insuring the thermostability of that part and whose support is of tungsten carbide with a cobalt or nickel binder, which product may be characterized as having a bonding interface whose composition varies progressively and evenly from a zone formed of tungsten carbide bonded directly to the support and having like the support a stoechiometric composition corresponding substantially to the formula WC, a transition zone to composition $W_2C$ and a transition zone to a residual metal tungsten layer having a metallurgical bond with the ultra-hard product.

The tungsten carbide consequently keeps all its mechanical qualities, even at the interface, because of the absence of production of an embrittling phase.

According to another aspect of the invention, there is provided a method for producing a composite abrasive body, comprising the steps of constituting a stack consisting of a mass predominantly of grains of ultra-high particulate material selected from diamond and CBN and of a material of such nature as to form a hard ceramic binder phase, a tungsten disk having a thickness of from 200 to 400 μm coated with carbon on its surface remote from said mass, and a support of pre-sintered refractory metal having a thickness much in excess of the thickness of said mass, and bringing said stack to a temperature and a pressure and for a time sufficient to cause mutual plastic phase sintering of the ultra-hard product grains and to bond the compact generated by the layers to the support.

The favorable results of the invention are only obtained on the condition that, during production, an intermediate tungsten layer and a carbon containing coating are used simultaneously which, during sintering, cause comburation of the tungsten with carbon and reduce carbon depletion of the substrate. In that respect, the method of the invention is extremely different from that described in U.S. Pat. No. 4,442,180. That document proposes producing tools comprising an active part with a polycrystalline diamond or CBN basis separated from a substrate of (Mo, W) $C_x$, where x is less than 1, which indicates carbon sub-stoechiometry, by an intermediate connecting layer formed of metal carbide less than 0.1 mm in thickness obtained by interpositioning a thin metal sheet during manufacture. Transformation of the metal into carbide takes place at the expense of the support. And, due to the small metal thickness, it is doubtful whether the sheet is able to avoid diffusion of the sintering binder toward the active part during manufacture.

The thermostable character of the active part may be obtained by use of different binding phases.

In the case where this active part is a compact formed essentially of diamond grains, the thermostable character may be obtained by using a binder phase containing, on the one hand, silicon and, on the other hand, iron and nickel, silicon and iron-nickel being alloyed. A binder phase may also be used containing titanium and nickel, i.e. one of the compositions described in European Patent Application No. 87 400 292.6, now published.

A binder phase may also be used formed from boron, titanium, silicon or compounds thereof (French No. 2,043,350), although this solution is less favorable.

When, on the contrary, the ultra-hard product contained in the active part consists of CBN, the binder phase may be formed of different combinations already known, having for example an aluminium, silicon and carbon base; or an aluminium, nickel and titanium base; or an aluminium, iron and titanium base. Numerous compositions of this kind have already been described, for example in European Patent Application published under No. 181,258.

The invention will be better understood from the following description of some embodiments, given by way of non-limitative examples.

SHORT DESCRIPTION OF THE DRAWINGS

FIG. 1. in which the scale is not respected, shows schematically how different compounds forming the product are positioned in a manufacturing cell;

FIG. 2, similar to FIG. 1, shows the nature of the final product.

DESCRIPTION OF A PREFERRED EMBODIMENT

Figure 1:
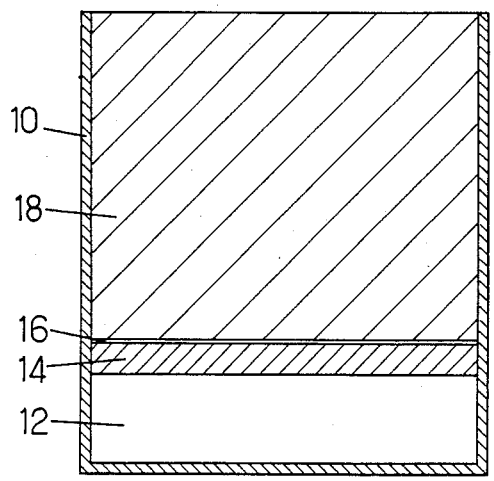

FIG. 1 shows the way in which the components of the abrasive product will generally be positioned for their manufacture. In a molybdenum cup 10, an assembly is first of all positioned formed of ultra-hard product grains typically having a grain size less than 150 μm, mixed with elements for forming the binder ceramic phase, so as to form a layer 12. On the layer 12 there is placed a tungsten disk 14 previously coated, on its face away from layer 12, with a thin coating 16 of carbon supplying material. In practice, the thickness of disk 14 will be between 200 and 400 μm. The coating may have a thickness of from 300 to 3000 Å and be obtained by vaporizing and depositing carbon in a vacuum.

Then, on the stack thus formed, the already sintered tungsten carbide support 18 is placed, or the components of this support, comprising the carbide, possibly in cemented form, containing the required sintering binder. In the embodiment shown in FIG. 1, the support is in the form of a pre-sintered stud 18.

Cup 10 is crimped into the tungsten carbide support so as to hold this letter in contact with the disk. The compact assembly thus obtained is placed in a pressure and temperature transmission cell and then processed in a press.

Figure 2:
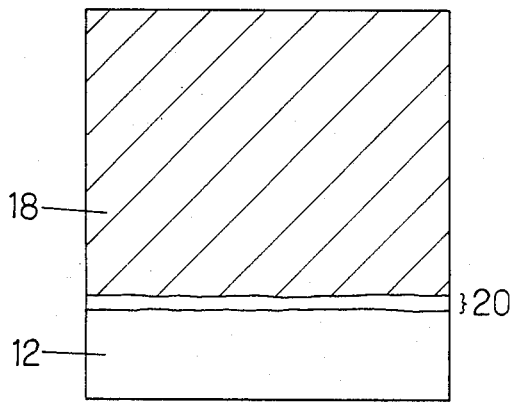

In the product obtained (FIG. 2), there is a thermostable active part resulting from layer 12 and the tungsten carbide support 18. At the interface 20, also thermostable, between the two elements, a progressive composition variation takes place from WC at the junction with the support 18 to a pure tungsten residue at the junction with the active part 12 which residue forms a diffusion barrier and prevents the cobalt binder contained in the carbide from passing.

Some embodiments will now be described, purely for illustration.

EXAMPLE 1

A volume of diamond grains whose grain size ranges between 10 and 60 μm is mixed intimately with a nickel-iron mixture having 15% per weight of iron, the amount of Fe-Ni representing 3.2% in weight of the total. On the bottom of a molybdenum cup 10, a silicon disk is placed having a thickness of 0.25 mm, representing 20% by weight of the Fe-Ni containing diamond mass with which it is then covered.

Then, a tungsten disk 250 μmm thick previously coated with a layer of about 100 nanometers of pure carbon and fitting within the inner diameter of the molybdenum cup 10 is placed on the diamond layer. A tungsten carbide support in the form of a plug is located on the stack in the cell. The cup is crimped onto the carbide support. The cup is placed in a press where it is subjected to pressures of about 60,000 bars and temperatures of the order of 1500° C. for about 3 mn. The product obtained is shaped by lapping and grinding which remove the silicon which is not infiltrated.

Comparative tests were then carried out on the product obtained under conditions representing the use thereof in earth drilling tools. The purpose of the tests was to determine the shearing stress causing breakage of the interface, at difference operating temperatures.

The shearing stresses causing breakage are as follows (in bars):

(1) Abrasive product formed of a tungsten support and a non-porous thermostable active part, manufactured without interpositioning a carbone layer:
at 600° C.: 3218 bars (47,300 psi)
at 770° C.: 2435 bars (35,800 psi)
at 900° C.: 2306 bars (33,900 psi).

(2) product in accordance with the invention: this product, heated to a temperature of 1100° C. in a neutral atmosphere, withstands shearing stresses exceeding $3061 \times 10^5$ Pascals, i.e. 45,000 psi.

EXAMPLE 2

CBN grains whose grain size ranges between 1 and 8 μm are intimately mixed with a mixture of silicon, aluminium and fine diamond powder in a ratio of 70% aluminimum, 30% silicon and a carbon content such that the number of carbon atoms is equivalent to the number of silicon atoms, the amount of binder representing 15% by weight of the total. This mixture is placed at the bottom of a molybdenum cup 10. Then on the CBN base layer is placed a tungsten disk 250 μm thick previously coated with a layer of pure carbon of about 100 nanometers and fitting perfectly in the inner diameter of the molybdenum cup 10. The cup is crimped onto the carbide support. The cup is placed in a press where it is subjected to pressures of about 60,000 bars and temperatures of about 1500° C. for approximately 3 nm. The product obtained is shaped by lapping and grinding.

Machining tests on the tampered steel known as "90 MVG" were then carried out; it was found that, under identical machining conditions, namely with lubricant and at a speed of 80 m/mn for a cut depth of 0.5 mm and an advance of 0.1 mm/revolution, the wear after 16 mn machining was 0.28 mm for the product of the invention whereas a commercial product exhibited a wear of 0.31 mm.

A complementary test was carried out under the same conditions without however using any lubricant. At the end of 16 mn, the product according to the invention showed a wear of 0.29 mm, i.e. substantially identical to the preceding test, whereas the cutting edge of the commercial product was totally destroyed during the first minutes of the test.

These tests thus show the thermostability of the product of the present invention.

I claim:

1. Method for producing a composite abrasive body having;
   an active compact containing grains of ultra-hard product representing more than 80% per volume of the compact, said grains mutually bonded directly so that the compact has a polycrystalline structure; and a hard refractory support bonded to the compact, formed essentially of a refractory metal carbide, comprising the steps of:
   placing, within a cell, a layer of grains of particulate ultra-hard product in contact with material of such nature as to generate a ultra-hard ceramic binder phase;
   placing a thin layer of tungsten coated with carbon supplying material over said layer of grains;
   placing a tungsten carbide support over said thin layer to constitute a stack; and
   bringing the cell containing the stack to a temperature and a pressure and for a time sufficient to cause mutual plastic phase sintering of the ultra-hard product grains and to bond the compact generated by the layers to the support.

2. Method according to claim 1, wherein the thin layer a tungsten disk of from 200 to 400 μm in thickness.

3. Method according to claim 2, wherein the carbon supplying material is a coating of substantially pure carbon with a thickness of 30 to 300 μm.

4. Method according to claim 3, wherein the coating is deposited on the tungsten layer by vacuum vaporization or vapor phase deposition.

5. Method for producing a composite abrasive body, comprising the steps of:
   constituting a stack consisting of a mass predominantly of grains of ultra-high particulate material selected from diamond and CBN and of a material of such nature as to form a hard ceramic binder phase, a tungsten disk having a thickness of from 200 to 400 μm coated with carbon on its surface remote from said mass, and a support of pre-sintered refractory metal having a thickness much in excess of the thickness of said mass, and bringing said stack to a temperature and a pressure and for a time sufficient to cause mutual plastic phase sintering of the ultra-hard product grains and to bond the compact generated by the layers to the support.

6. Method according to claim 5, wherein said material forming a binder phase essentially consists of a mixture of nickel and iron intimately mixed with said grains and of a silicon disk supporting said mass.

7. Method according to claim 5, wherein said ultra-high material is CBN and said material for forming a binder phase consists of a mixture of powdered silicon, aluminum and diamond.

8. Abrasive product having:
   an abrasive body which consists of a predominant proportion of an ultra-hard product and a binder phase for thermostability of the body; a sintered tungsten carbide support containing cobalt as a binder; and a bonding interface between said body and support whose composition varies progressively and steadily from a zone formed of tungsten carbide bonded directly to the support and having a stoechiometric composition substantially corresponding to the formula WC, a transition zone to the composition $W_2C$ and a transition zone to a residual metal tungsten layer having a metallurgical bond with the ultra-hard product.

9. Abrasive product according to claim 8, wherein the bonding interface is thermostable.

* * * * *